Jan. 24, 1967 K. WYSOCKI 3,299,495
APPARATUS FOR DIRECTING APPLICATOR AND OTHER
CAP EXTENSIONS INTO CONTAINERS
Filed March 23, 1965 5 Sheets-Sheet 1

INVENTOR.
KAZMIER WYSOCKI,
BY

INVENTOR.
KAZMIER WYSOCKI,
BY
Raymond N Matson

INVENTOR.
KAZMIER WYSOCKI,
BY
Raymond N. Matson

INVENTOR.
KAZMIER WYSOCKI,
BY Raymond N. Matson

United States Patent Office 3,299,495
Patented Jan. 24, 1967

3,299,495
APPARATUS FOR DIRECTING APPLICATOR AND OTHER CAP EXTENSIONS INTO CONTAINERS
Kazmier Wysocki, 293 Hudson St.,
Hackensack, N.J. 07601
Filed Mar. 23, 1965, Ser. No. 447,115
15 Claims. (Cl. 29—208)

This invention relates to a guiding mechanism for directing the applicators or cap extensions of applicator-type closures into the mouths of small-mouth containers traveling in spaced relation on a conveyor and is an improvement over the guiding mechanisms of the apparatus disclosed in my Patents No. 2,810,249, dated October 22, 1957, and 3,141,278, dated July 21, 1964.

As described in the earlier patent, the apparatus comprises at least one endless means including thereon spaced placement means which include applicator guide portions in the general form of funnel elements. The apparatus also includes means for moving the endless means so that at least some of the placement means periodically travel in synchronous aligned rotation with the mouths of the spaced containers on the conveyor. The directing means further include means cooperating with the applicator guide portions of the aligned placement means for periodically creating with the funnel elements thereof funnels having apertures in the bases thereof which permit the applicators of the closures to be directed therethrough into aligned relation with the mouth of the containers while periodically retaining the body portions of the closures in the funnels.

While the guiding mechanism described above is capable of reliable operation at high speeds, the permissible eccentricity of the cap extension (dip tube, applicator, or other attachment) of the applicator type closure is limited to the diameter of the funnel opening through which it must be lowered which is in turn limited by the practical physical limitations of size and available space. Where the permissible eccentricity of the cap extension is exceeded, jamming of the apparatus can result with a consequent material reduction in the output of assembled container and closure units.

The later patent provides an improved guiding mechanism which obviates the above-mentioned difficulties of the earlier patent due to the eccentricity of the cap extension by employing encircling jaws including an aperture having a scissors-like action to envelop the cap extensions intermediate their length. The cap is then raised to draw the extension almost through the aperture so as to clear the container which is moving into axially aligned position with the aperture of the jaws.

The present invention relates to a further improvement on the guiding mechanism described in my above-mentioned patents and the main object of the invention is to provide a cap extension guiding mechanism having smaller, more compact and co-planar guiding jaws which will enable a more compact mechanism as a whole and provide more continuous guidance right through to the container opening, as compared to the overlapping scissors which leave a gap the thickness of the jaws between the top jaw and the container opening during half of their closing circle.

An important object of the present invention is to provide an improved guiding mechanism for directing the applicator or cap extensions of applicator-type closures wherein the cap extension is engaged immediately adjacent the cap by a pair of aperture-defining cooperating jaws to effect a more efficient and materially more compact apparatus.

Other objects and advantages of the present invention will become apparent during the course of the following description.

In the drawings I have shown several embodiments of the invention. In this showing:

FIGURES 13, 14, 15, and 16 are further applications of the principles of the improved guiding jaw mechanism of the present invention.

Applicator directing apparatus

Figure 1:
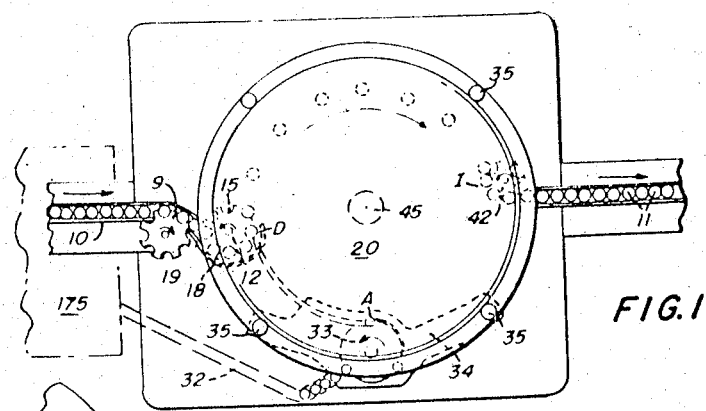
FIGURE 1 is a plan view of the automatic capping or closure applying machine as disclosed in my Patent No. 2,810,249 including the improved apparatus of the present invention for directing the applicators of applicator-type closures into the mouths of small mouth containers.
Figure 2:
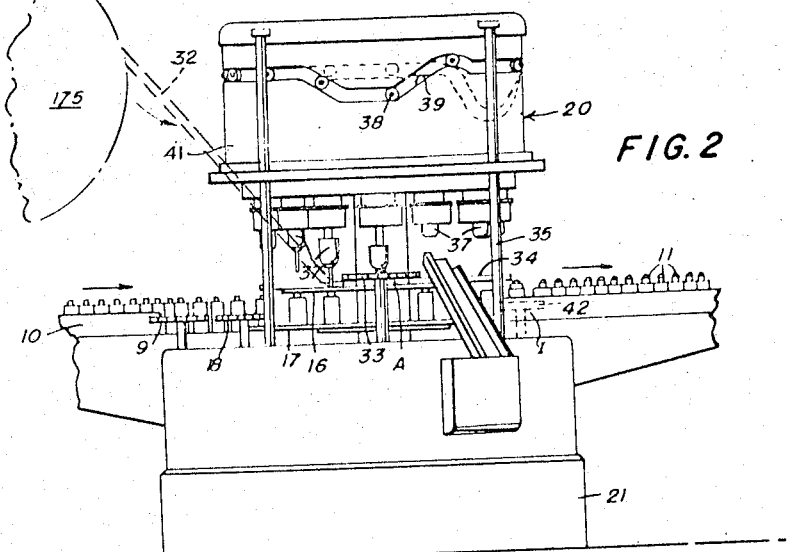
FIGURE 2 is an elevational view thereof.

Referring to FIGURES 1 and 2 of the drawings, numeral 10 designates a portion of a conveyor for delivering to a timing star 9 and thence to a notched rotary disk or infeed timing star 12, containers 11 which are adapted to hold a desired fluid, paste, powder, granular, or other form of product, etc. The timing star 9 serves to hold back the infeed line pressure and to release containers to the infeed timing star 12 in proper timing to be engaged by a star pocket. The containers are therefore of a type which are adapted to receive applicator-type closure including a cap extension 13 (dip tube or other attachment) and a cap or body portion 14 adapted to be pressed into or over the small mouth of a container 11. The disk has a plurality of spaced, container receiving notches 15 therein and a curved guide rail 18 for maintaining the containers on a platform 19 beneath a portion of the disk.

The automatic capping machine of FIGURES 1 and 2 includes an apparatus 20 for directing the applicators 13 of the applicator-type closures 14 into the mouths of the small-mouth containers. This apparatus includes an endless means or disk-type rotor 17 for conveying the containers thereon in spaced relation. The rotor 17 and the disk 12 are driven in a conventional manner in the direction indicated in FIGURE 1 and at suitable speeds in synchronous relation by a motor (not shown) within the base 21 of the apparatus.

The rotor or disk 17 is supported by a casting 17A and a jaw mounting plate 16 is supported above the rotor 17 by means of spacers 16A, all rotatable as a unit. Spaced placement means 22 (FIGURES 6 to 9 inclusive) which include improved applicator guide portions in the form of cooperating pairs of jaws are mounted on the plate 16 adjacent its periphery.

Each of the co-planar jaws includes an extension 23 having a semi-circular inner face portion and a pivoted arm 24 pivoting on pins 25 and driven by an arm 70 which is carried by and suitably keyed or secured to a vertical shaft 72 extending normally of the rotor 17 and rotatable therein. Each arm 24 has a gear sector 26 formed integrally therewith and meshing with the gear sector on a cooperating, adjacent arm and with the gear sector 27 on the arm 70. The latter is the upper arm of a bell crank mechanism and is keyed to a vertical pivot shaft 72 as is a lower arm 73.

Each lower arm carries a cam follower 28 that rides against the fixed disk cams 29 and 29A which are fixed to the frame 29B beneath the rotor 17. The cams are shaped so as to periodically oscillate the jaws 23 about their pins 25 to effect their opening and their closing. As stated, each pivoted jaw arm 24 has an extension 23 with a semi-circular inner face portion so that upon closing, the jaws confine a closure cap extension in a guiding aperture or pocket 30 formed by the semi-circular portions.

Figure 3:
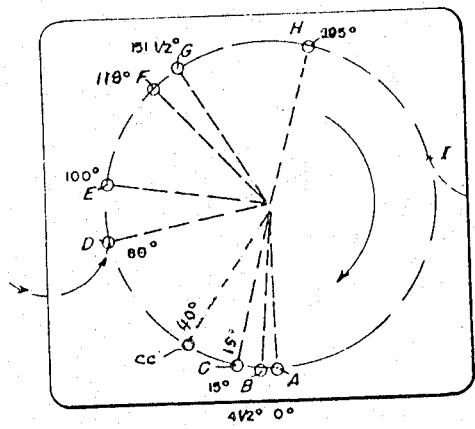
FIGURE 3 is a schematic plan view showing the timing sequence of the machine.

At position A (FIGURES 1 to 3 inclusive) a suitable declined conveyor 32 associated with a hopper 175, both of which are represented in phantom, is employed to bring individual closures into a position to drop with their extensions lowermost into the openings in a star-wheel feed mechanism 33 (FIGURES 4 and 5) rotatably mounted just above a bridging member or bridge 34 spanning a pair of a plurality of top supporting uprights 35. The bridge 34 has a cap-extension receiving slot 36 formed therein to guide the cap from the chute 32 around the star-wheel 33 into the arc of rotation of the jaws of a conventional chuck 37 which pick it up and carry it clockwise (FIGURES 1 and 3) toward the exit end I of the apparatus 20.

As set forth in my Patents 2,810,249 and 3,141,278, the apparatus 20 includes a plurality of chucks 37 arranged in circumferentially spaced relation above the rotor 17. In addition to being rotated in a circular path in synchronous relation with the rotor 17, the chucks are actuated vertically in a predetermined manner by a cam roller 38 confined in a cam track 39 disposed in an upper cylindrical wall 41 of the apparatus 20. In the case of all types of closures except the screw-on type, the chucks do not rotate about their own axes and the mechanism for effecting the same is omitted as are the container gripping jaws.

Operation

During the operation of the automatic capping machine and its novel cap extension guiding means, the motor in the base 21 drives the notched rotary star-wheels 9, 12, 33 and a container discharge star-wheel 42 in proper synchronous relation with the rotor 17 so that closures 14 received from the chute 32 are being deposited beneath successive descending chucks 37 at position A while bottles 11 supplied from the conveyor 10 are deposited by the disk 12 in spaced relation on the rotor 17 at position D. The descent of successive ones of the chucks 37 for gripping the closures 14 is controlled by the cam rollers 38 riding in the cam track 39 as stated. The chucks 37 and rotor 17 are supported for rotation about the center of the apparatus 20 by means of a central shaft 45 as set forth in the Patent No. 2,810,249.

At position A (FIGURE 3, see also FIGURES 4, 5, 6, and 7), the jaws 23 are open and a chuck 37 is descending and in contact with a closure 14. The chuck completes its connection with the closure 14 and its extension 13 at B, drawing it away from the star-wheel 33 along and from the slot 36 in the pick-up plate or bridge 34, the jaws 23 still being open as illustrated in FIGURE 6. At C the spindle with the chuck held closure begins to descend (FIGURE 4) and continues to approximately the point CC at which the height of the guide jaws 23 is very close to the connection of the cap extension with the cap. At point CC, the jaws 23 close and envelop or encircle the cap extension closely adjacent this point of connection at which the extension 13 is very nearly concentric with the body of the cap or closure 14.

Figure 9:
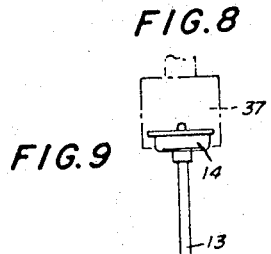
FIGURE 9 is an elevational view thereof.

As the rotor 17 continues its rotation with the cap extension 13 in the guiding aperture or pocket 30 in the semi-circular portions of the jaws 23, the chuck 37 rises until the cap and its extension are raised approximately ⅛" above a container 11 at point D as illustrated in FIGURE 9. It will be noted that the lower end of the cap extension 13 is held confined in the aperture 30 of the guide jaws 23 exactly concentric and in axial alignment with the opening of a container 11. The container and rotor then move in synchronous relation in a clockwise direction toward position E during which time the closure is suspended by the chuck over the container.

It is to be noted that the pivoted, abutting guiding jaws 23, as contrasted to those disclosed in Patent 3,141,278, are not only co-planar and more vertically compact as compared to the scissors action but are even more so in that the gear sectors 26 are formed integral and also co-planar with the jaw arms 23 so as to enable a material height reduction therein and in the mechanism as a whole. Further, instead of gripping the cap extensions intermediate their length as in the patent, the guiding jaws 23 further overcome the previous eccentricity limitations by encircling the cap extension 13 in the pocket 30 immediately adjacent to its point of attachment to the cap 14 where the eccentricity is substantially non-existent. The closing of the jaws confines the cap extension to a diameter of enclosure considerably smaller than the opening in the container 11 which is to receive it. The raising of the cap and its extension by the chuck thus not only straightens the extension but permits the container 11 to enter the machine under the extension.

Figure 8:
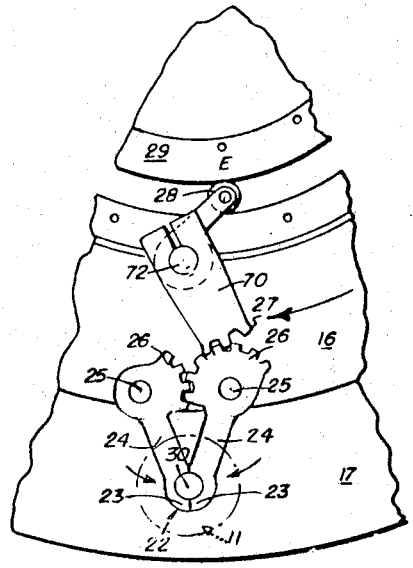
FIGURE 8 is a fragmentary plan view of the guide jaws in closed position enveloping an applicator or cap extension just prior to its insertion in a container.
Figure 7:
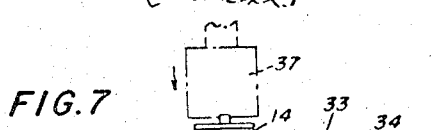
FIGURE 7 is an elevational view thereof showing the position of a cap extension with respect thereto.

At position E, as shown in FIGURES 8 and 9, the chuck 37 starts down and the cap extension 13 starts to enter the container 11 and at position F, guidance of the cap extension no longer being required, the guiding jaws begin to open as effected by the cam follower 28 and cam 29, and are fully opened at position G. The jaws now being out of the way, the chuck 37 descends further and presses the cap 14 into or onto the container 11. At position H the chuck begins to rise and the container 11 with its fastened closure 14 is engaged by the star-wheel 42 at position I and removed from the rotor 17 onto a suitable conveyor where the containers are carried to subsequent operations in the packaging procedure. Successive containers 11 on the rotor 17 are handled as explained above in connection with a single chuck, its closure and associated container.

Figure 4:
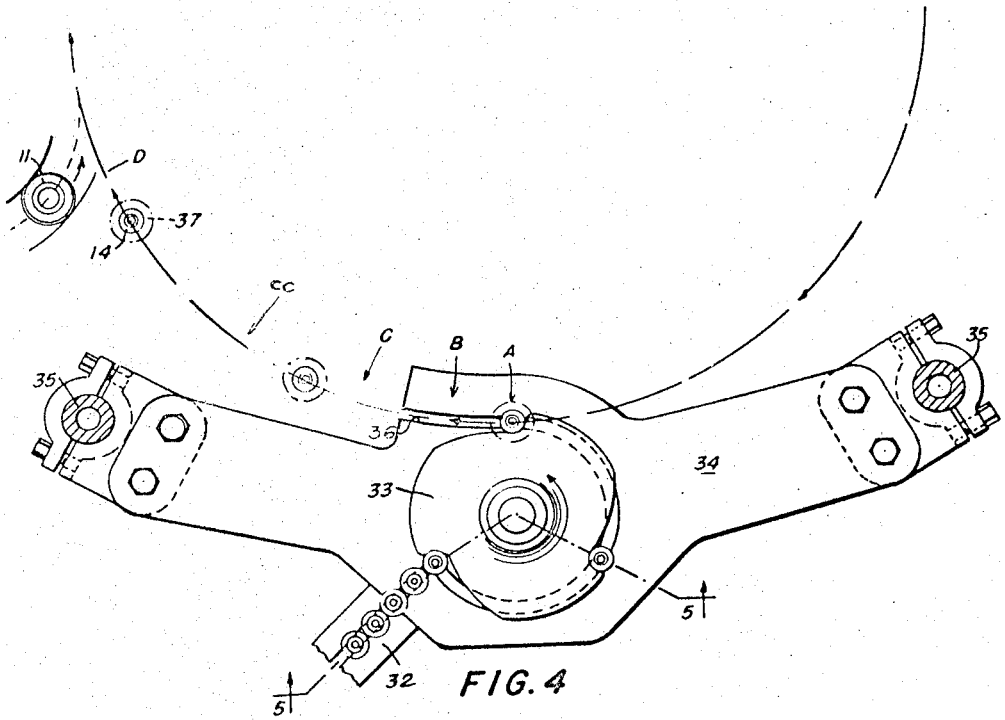
FIGURE 4 is a fragmentary plan view to an enlarged scale of the cap or closure feed assembly.
Figure 5:
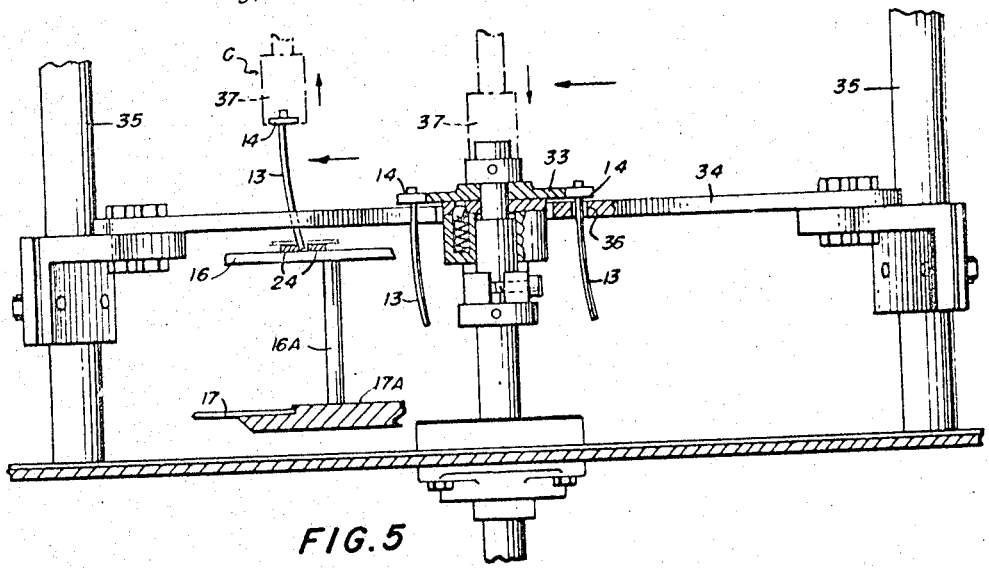
FIGURE 5 is an elevational view thereof.
Figure 4A:
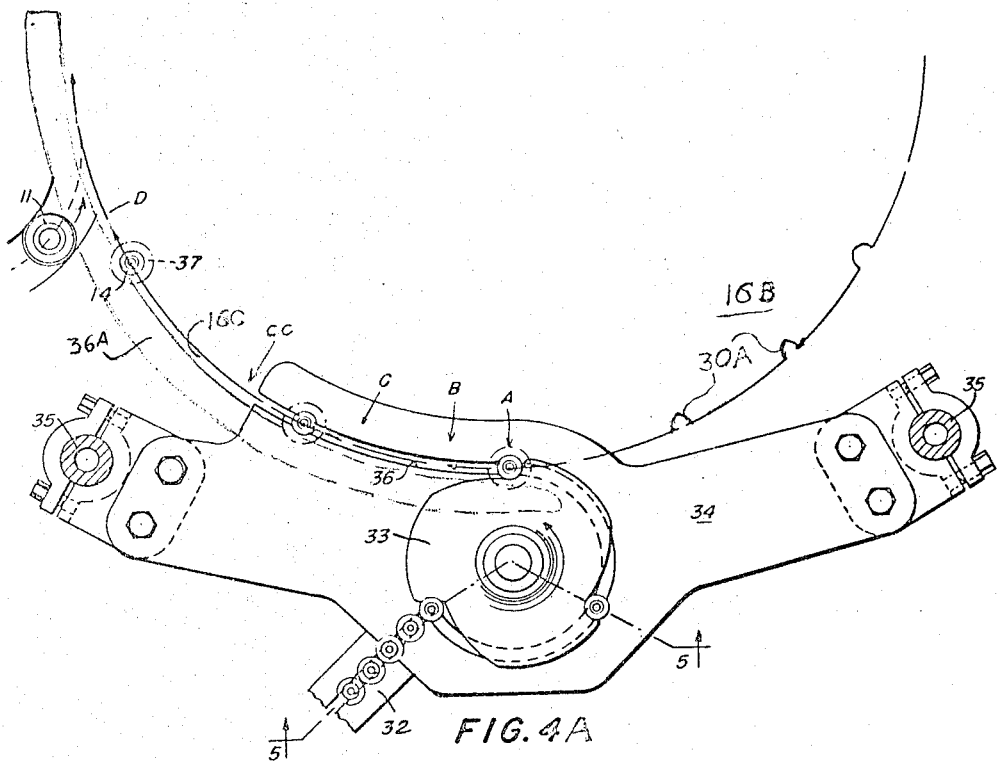
FIGURES 4A and 5A are respectively similar to FIGURES 4 and 5 but show a different embodiment of the invention.
Figure 5A:
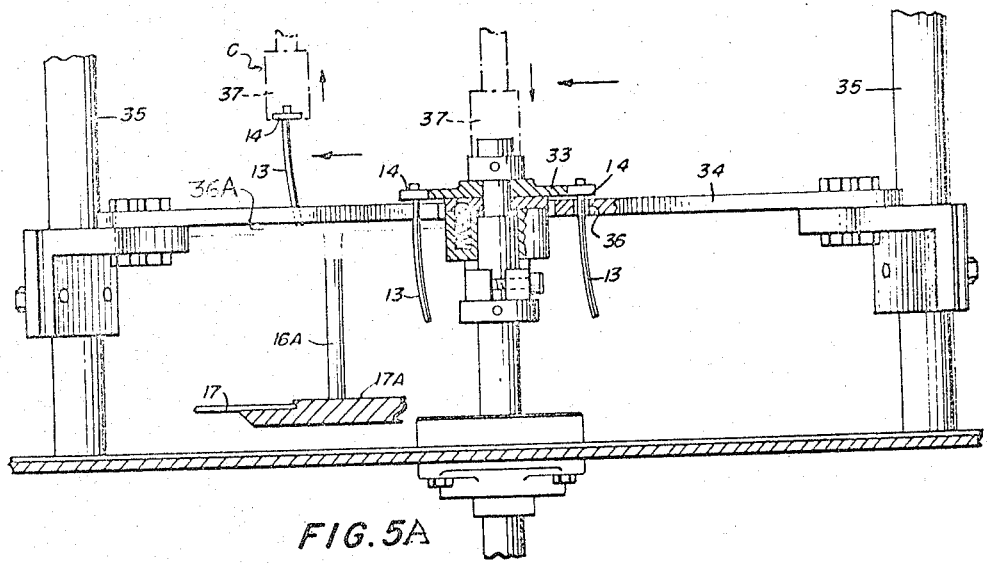
Figure 6:
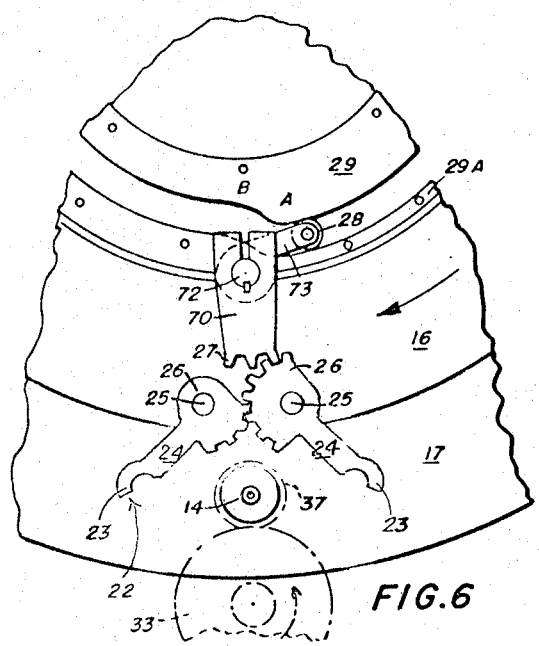
FIGURE 6 is a fragmentary plan view of the improved guiding mechanism jaws in open position.

A modified form of the invention is disclosed in FIGURES 4A and 5A which are similar to FIGURES 4 and 5 except that the guide jaws 23, arms 24 and sectors 26 of the placement means 22 are omitted. Instead, a rotary disk 16B having circumferentially spaced arcuate edge pockets 30A which are concentrically aligned with the spaced positions of the containers 11, is provided and mounted on the spacers 16A to rotate in synchronism with the rotor 17.

An extended arcuate guide track 36A which is concentric with the rotary disk 16B and slightly spaced as at 16C therefrom (less than the diameter of a cap extension 13), is arranged co-planar with the pocketed disk 16B and mounted on the bottom of the pick-up plate or bridge 34. The periodic and synchronized action of the chucks 37 and their spindles is the same as previously described herein except that the chucks release the caps or closures 14 slightly above the pocketed disk 16B since the size of the pockets 30A is smaller than that of the closures.

It will be apparent that in use, a closure 14 is delivered by the star-wheel 33 to position A just as a pocket 30A in the disk 16B arrives there to encircle the cap extension 13 at its connection with the cap. The chuck 37 contacts the cap at A, completes its contact at B, starts to rise with it at CC with the extension 13 being enveloped by a pocket 30A and the side of the arcuate guide track 36A. As the rotor 17 rotates, the chuck rises until the closure and the extension are raised approximately 1/8" above the container at D with the lower end of the extension 13 still being confined by the pocket 30A and the track 36A in a position concentric with the opening of the container 11. At position E, the chuck 37 starts down and the cap extension 13 starts to enter the container 11 and is released by the chuck. The cap and its extension is then moved along the track 36A by the container which slides it off the track to be rested in the container neck.

Figure 10:
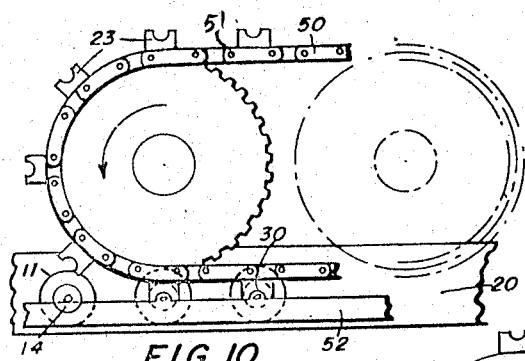
FIGURE 10 is a fragmentary plan view of a modified form of the apparatus of FIGURE 1.
Figure 11:
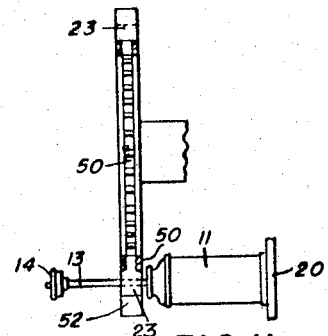
FIGURE 11 is an end view thereof.

The apparatus disclosed in FIGURES 10 and 11 for directing the cap extensions of applicator and dip tube type containers is similar to the apparatus of FIGURE 1. Accordingly, corresponding elements are designated by the same reference characters. An endless belt 20 is employed for receiving the containers 11 from the distributing disk 12 (not shown) and carrying them in a spaced relation in a straight line. An endless means in the form of a chain belt 50 has portions extending in a line parallel to the belt 20 and includes around the periphery thereof spaced arcuate shaped jaw elements 23 secured to various of the chain links by lugs 51. The jaw elements cooperate with the edge of a fixed guide rail 52 which overlap them to form enveloping and guiding jaws for aligning a cap extension 13 with the mouths of the containers 11 as is further explained below.

Figure 12:
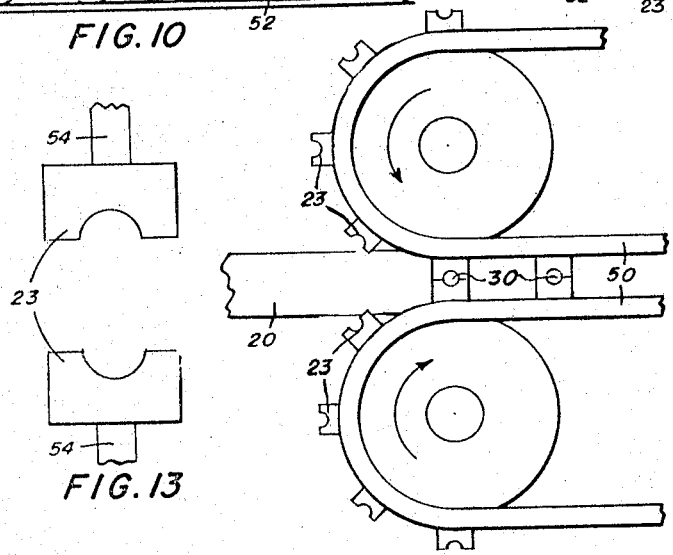
FIGURE 12 is a modified form of the apparatus shown by FIGURE 10.

FIGURE 12 discloses an apparatus very similar to that of FIGURES 10 and 11 except that the guide rail 52 is omitted and a pair of chain belts 50 are employed and synchronously driven with the belt 20. The spacing of the chain belts 50 is such that as a pair of the semi-circular or arcuate shaped jaw elements 23 approach a container on the delivery end of belt 50 they have an abutting and encircling action and proceed to encompass the cap extension 13 of a cap 14 to form a guide (as in FIGURES 6 and 8) and permit the cap extension to be dropped into the mouth of a container 11. Successive arcuate shaped jaw elements so cooperate and move along with the containers 11 on the straight line conveyor belt 20. At the exit end of the chain belts 50, the arcuate, aperture defining shaped jaw elements 23 separate and the containers continue along the belt 20 to another work station where the caps may be pushed into or on the container mouths.

Figure 13:
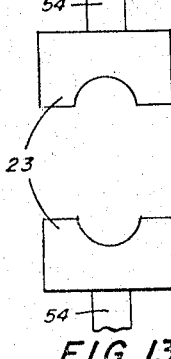
Figure 14:
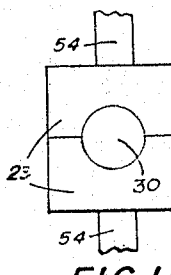
Figure 15:
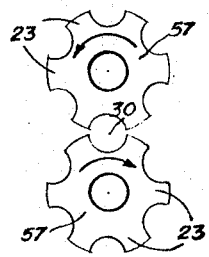
Figure 16:
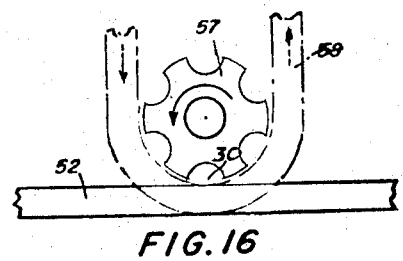

As shown in FIGURES 13 and 14, the abutting and encircling action of the enveloping and guiding arcuate shaped notches of the jaws 23 may be embodied in single unit devices in fixed locations for use on intermittent action machines where containers and closures enter and leave in intermittent motions. As shown, the notches of the cooperatintg jaws 23 may be closed (from position of FIGURE 13 to position of FIGURE 14) by attaching the jaw support members 54 to mechanisms for timed motion in relation to other mechanisms. A similar enveloping and guiding jaw action is obtained as shown in FIGURE 15 by a pair of spaced star-wheels 57 having arcuate notches 23 which form the pocket 30. As shown in FIGURE 16, a single star-wheel 57 may cooperate with a guide rail 52 as in FIGURE 10 with flow of the caps along the line of the guide rail. Alternately, the flow can be adjacent the star-wheel to allow time for more pocket duration in which case the rail is of curved shape as shown in dotted lines at 58.

It is to be understood that the forms of my invention herewith shown and described are to be taken as preferred examples of the same and that various changes in the shape, size and arrangement of parts may be resorted to without departure from the spirit of the invention or the scope of the subjoined claims.

I claim:
1. An apparatus for directing the extensions of closure caps into the mouths of small-mouth containers traveling on a conveyor comprising, in combination, at least one endless means including thereon spaced placement means which include closure cap extension guide portions in the general form of co-planar cooperating jaws having abutting end portions each having a semi-circular inner face portion; means for moving said endless means so that at least some of said placement means periodically travel in synchronous aligned relation with the mouths of spaced containers on the conveyor; means cooperating with said cap extension guide portions of said aligned placement means for periodically creating with the semi-circular inner face portions of the abutting end portions of the jaws thereof, encircling jaws including an aperture which engage the cap extensions at their connection with the closure caps and hold the engaged portion thereof in aligned relation with the mouths of the containers; means forming a part of said placement means for suspending closure caps and their extensions in vertical alignment with the mouths of said containers; and additional means for feeding said caps to said suspension means and guiding them in the path thereof for suspension engagement thereby; said suspending means moving vertically relative to said encircling jaws to draw said extensions through said apertures to align the lower portions of said extensions with said container mouths.

2. The combination recited in claim 1 wherein said cooperating means comprises meshing gear sectors formed integrally with an end of said jaws, a cam roller mounted on a gear segment meshing with one of said sectors, and a cam engaging said roller operative to pivot said jaws into abutting relationship.

3. An apparatus for directing the extensions of closure caps into the mouths of small-mouth containers traveling on a conveyor comprising, in combination, at least one endless means comprising a disk including thereon spaced placement means which include closure cap extension guide portions in the general form of co-planar cooperating jaws having abutting end portions each having a semi-circular inner face portion; means for moving said endless means so that at least some of said placement means periodically travel in synchronous aligned relation with the mouths of spaced containers on the conveyor; means cooperating with said cap extension guide portions of said aligned placement means for periodically creating with the semi-circular inner face portions of the abutting end portions of the jaws thereof, encircling jaws including an aperture which engage the cap extensions at their connection with the closure caps and hold the engaged portion thereof in aligned relation with the mouths of the containers; means forming a part of said placement means for suspending closure caps and their extensions in vertical alignment with the mouths of said containers; and additional means for feeding said caps to said suspension means and guiding them in the path thereof for suspension engagement thereby; said suspending means moving vertically relative to said encircling jaws to draw said extensions through said apertures to align the lower portions of said extensions with said container mouths.

4. The combination recited in claim 3 wherein said cooperating means comprises meshing gear sectors formed integrally with an end of said jaws, a cam roller mounted on a gear segment meshing with one of said sectors, and a cam engaging said roller and operative to pivot said jaws into abutting relationship.

5. An apparatus for directing the extensions of closure caps into the mouths of small-mouth containers traveling on a conveyor comprising, in combination, at least one endless means having a portion extending in a straight line and including around the periphery thereof spaced placement means which include closure cap extension guide portions in the general form of co-planar cooperating jaws having abutting end portions each having a semi-circular inner face portion; means for moving said endless means so that at least some of said placement means periodically travel in said straight line and in synchronous aligned relation with the mouths of spaced containers on the conveyor; means cooperating with said cap extension guide portions of said aligned placement means for periodically creating with the semi-circular inner face portions of the abutting end portions of the jaws thereof, encircling jaws including an aperture which engage the cap extensions at their connection with the closure caps and hold the engaged portion thereof in aligned relation with the mouths of the containers; means forming a part of said placement means for suspending closure caps and their extensions in vertical alignment with the mouths of said containers; and additional means for feeding said caps to said suspension means and guiding them in the path thereof for suspension engagement thereby; said suspending means moving vertically relative to said encircling jaws to draw said extensions through said apertures to align the lower portions of said extensions with said container mouths.

6. The combination as recited in claim 5 wherein said cooperating means comprises a guide rail arranged adjacent the straight line portion adapted to successively overlie most of each of said jaws to form the aperture.

7. The combination as recited in claim 5 wherein said cooperating means comprises a second endless means having a straight portion parallel to and adjacent said straight line portion and movable in timed relation with said first endless means, and jaws projecting from said second endless means and abutting said first jaws to form said encircling jaw aperture for the cap extensions.

8. An apparatus for directing the extensions of closure caps into the mouths of small-mouth containers traveling on a conveyor comprising, in combination, at least one endless means including thereon spaced placement means which include closure cap extension guide portions in the general form of spaced, peripheral notches; means for moving said endless means so that at least some of said placement means periodically travel in synchronous aligned relation with the mouths of spaced containers on the conveyor; means cooperating with said cap extension guide portions of said aligned placement means for periodically creating with the notches thereof apertures the sides of which engage the cap extensions at their connection with the closure caps and hold the engaged portion thereof in aligned relation with the mouths of the containers; and means forming a part of said placement means for suspending closure caps above and their extensions in vertical alignment with the mouths of said containers; said suspending means effecting relative vertical motion of said extensions with respect to said notches to draw said extensions through said apertures to align the lower portions of said extensions with said container mouths.

9. The combination recited in claim 8 wherein said cooperating means includes an arcuate track closely radially spaced from said notches of said placement means to define said extension receiving apertures therewith.

10. The combination recited in claim 8 wherein said suspending means comprises a plurality of closure cap engaging and holding chucks movable to effect said relative vertical motion to align the lower portion of said extensions with and to permit their insertion in said container mouths.

11. An apparatus for directing the extensions of closure caps into the mouths of small-mouth containers traveling on a conveyor comprising, in combination, at least one endless means including thereon spaced placement means which include closure cap extension guide portions in the general form of spaced, peripheral notches; means for moving said endless means so that at least some of said placement means periodically travel in synchronous aligned relation with the mouths of spaced containers on the conveyor; means cooperating with said cap extension guide portions of said aligned placement means for periodically creating with the notches thereof apertures the sides of which engage the cap extensions at their connection with the closure caps and hold the engaged portion thereof in aligned relation with the mouths of the containers; means forming a part of said placement means for suspending closure caps above and their extensions in vertical alignment with the mouths of said containers; and additional means for feeding said caps to said suspension means and guiding them in the path thereof for suspension engagement thereby; said suspending means effecting relative vertical motion of said extensions with said notches to draw said extensions through said apertures to align the lower portions of said extensions with said container mouths.

12. The combination recited in claim 11 wherein said cooperating means includes an arcuate track closely radially spaced from said notches of said placement means to define said extension receiving apertures therewith.

13. The combination recited in claim 11 wherein said suspending means comprises a plurality of closure cap engaging and holding chucks movable to effect said relative vertical motion to align the lower portion of said extensions with and to permit their insertion in said container mouths.

14. In an apparatus for aligning closure cap extensions with and assembling them within the mouths of containers moving into vertical alignment with the closure caps thereof, a pair of pivoted co-planar jaws including abutting end portions each having a semi-circular inner face portion which cooperate to form a cap extension guiding aperture when said jaws are pivoted to a closed position, and means for pivoting said jaws to engage said extensions immediately adjacent said caps and to elevate said extensions through the formed guiding aperture to align the lower end of said extensions with the mouths of said containers.

15. The combination recited in claim 14 wherein said pivoting means comprises meshing gear sectors formed integrally with an end of said jaws, a cam roller mounted on a gear segment meshing with one of said sectors, and a cam engaging said roller and operative to pivot said jaws into abutting relationship.

References Cited by the Examiner
UNITED STATES PATENTS 2,810,249  10/1957  Wysocki _____ 29—208 X
3,141,278  7/1964   Wysocki _____ 53—319

JOHN F. CAMPBELL, *Primary Examiner.*

THOMAS H. EAGER, *Examiner.*